United States Patent

[11] 3,544,752

[72] Inventors Gunther Lehnert
Hannover-Bothfeld;
Harald Roderburg; Gerhard Ziemek,
Hannover, Germany
[21] Appl. No. 720,504
[22] Filed April 11, 1968
[45] Patented Dec. 1, 1970
[73] Assignee Kabel-und Metallwerki Gutehoffnung-shutte Aktiengesellschaft,
Hannover, Germany,
a corporation of Germany

[54] MULTI-ARC SEAM WELDING APPARATUS FOR THIN METAL SHEET
5 Claims, 2 Drawing Figs.

[52] U.S. Cl. .................................................... 219/60,
219/61
[51] Int. Cl. ..................................................... B23k 9/02
[50] Field of Search .......................................... 219/130,
124, 125, 61

[56] References Cited
UNITED STATES PATENTS

| | | | |
|---|---|---|---|
| 2,061,671 | 11/1936 | Riemenschneider .......... | 219/124 |
| 2,189,399 | 2/1940 | Lewbers ...................... | 219/124 |
| 2,856,510 | 10/1958 | Jones et al .................. | 219/74 |
| 2,950,378 | 8/1960 | Tuthill ......................... | 219/74 |
| 3,242,309 | 3/1966 | Anderson et al ............ | 219/124 |
| 3,391,269 | 7/1968 | Libby .......................... | 219/125 |
| 3,432,638 | 3/1969 | Nelson et al ................ | 219/125 |

*Primary Examiner*—J. V. Truhe
*Assistant Examiner*—Hugh D. Jaeger
*Attorney*—Philip G. Hilbert

ABSTRACT: A multiarc welding apparatus for welding longitudinal seams in thin metal sheet such as metal sheathed cable core moving at high speed to form a precision welded seam therein.

MULTI-ARC SEAM WELDING APPARATUS FOR THIN METAL SHEET

BACKGROUND OF THE INVENTION

In producing welded seams in the presence of an inert gas shield, use has been made of multiarc apparatus to improve the quality of the welded seam and to increase the rate of formation of such welded seam. Thus, as shown in U.S. Pat. No. 3,242,309, several nonconsumable welding electrodes are fixed in a single holding means. Such holding means is formed of copper blocks or plates separated from each other by suitable insulation. The electrodes are cooled by a common water circulating system and the holding means is provided with conduits for supplying protective gas such as argon to the electrodes and the welding area.

The use of known multiarc welding apparatus for producing welded seams has led to some difficulties, particularly when forming welded seams in thin metal strip or sheet to convert the same to tubular form. Here it is vital that the welding electrodes be exactly positioned relative to each other and with respect to the adjacent edges of the metal strip or sheet to insure precision welding while the material being welded moves past the welding station at high speeds.

Accordingly, an object of this invention is to provide improved multiarc welding apparatus wherein the individual electrodes are arranged in a manner to allow for precise adjustment of the same to suit seam welding conditions at any given time, including correlating the same with the particular metal being welded, compensation for burning-off at the electrode tips, variations in the longitudinal seam details, energy distribution to the electrodes, and the like.

To achieve a satisfactory welded seam under favorable welding conditions, it is necessary that the tip of the individual welding electrodes have a relatively small cross section. As a result and consequent to the high welding temperatures as well as the influences of the force of the welding arc, the electrode tips have a tendency to bend and to be displaced from their normal position. Such deviation in the location of the electrode tips leads to defects in the welded seam. While the cross section of the electrode tip can be increased to avoid bending and displacement, however the welding action as a whole is then adversely affected.

Accordingly, another object of this invention is to provide in a multiarc welding apparatus of the character described, means for adjusting the positions of the individual welding electrodes so that their tips are at all times properly located with respect to the seam to be formed.

A further object of this invention is to provide improved means for supplying protective gases to the welding electrodes and the welding area and including hood means related to the object being welded so that the protective gas is supplied laterally, rather than vertically as in conventional welding apparatus thereby producing an inert pressure-free atmosphere of protective gas whereby the quality of the welded seam is improved substantially.

In accordance with the instant invention, each welding electrode is mounted in an individual holder; the holders being arranged to provide separate or conjoint adjusted movement of the electrodes. This allows for selective use of any given number of electrodes, for varied spacing between the electrodes through the use of spacer elements and otherwise suit the particular metal being welded and the welding conditions.

To avoid any adverse effects incident to the use of high frequency currents for automatic ignition of the welding arc, in respect to the electrode holders, and further, to provide for adequate cooling of the electrodes during the welding operation, it is particularly advantageous to make the electrode holders from a refractory ceramic material having a high heat conductivity. The ceramic electrode holder has suitable passages therein for mounting the electrodes, for the passage of coolant and for current supply input means.

DESCRIPTION OF A PREFERRED EMBODIMENT

Figure 1:
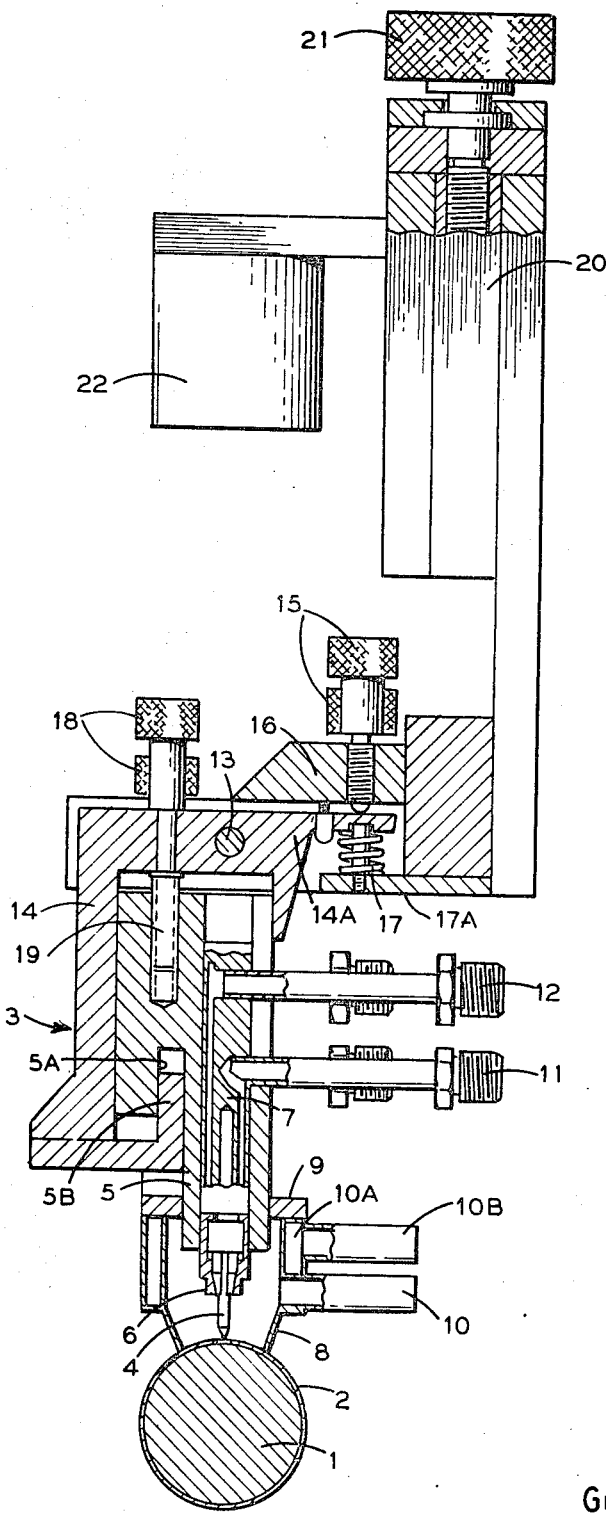
FIG. 1 is an elevational view with parts in section, showing the multiarc welding apparatus embodying the invention.
Figure 2:
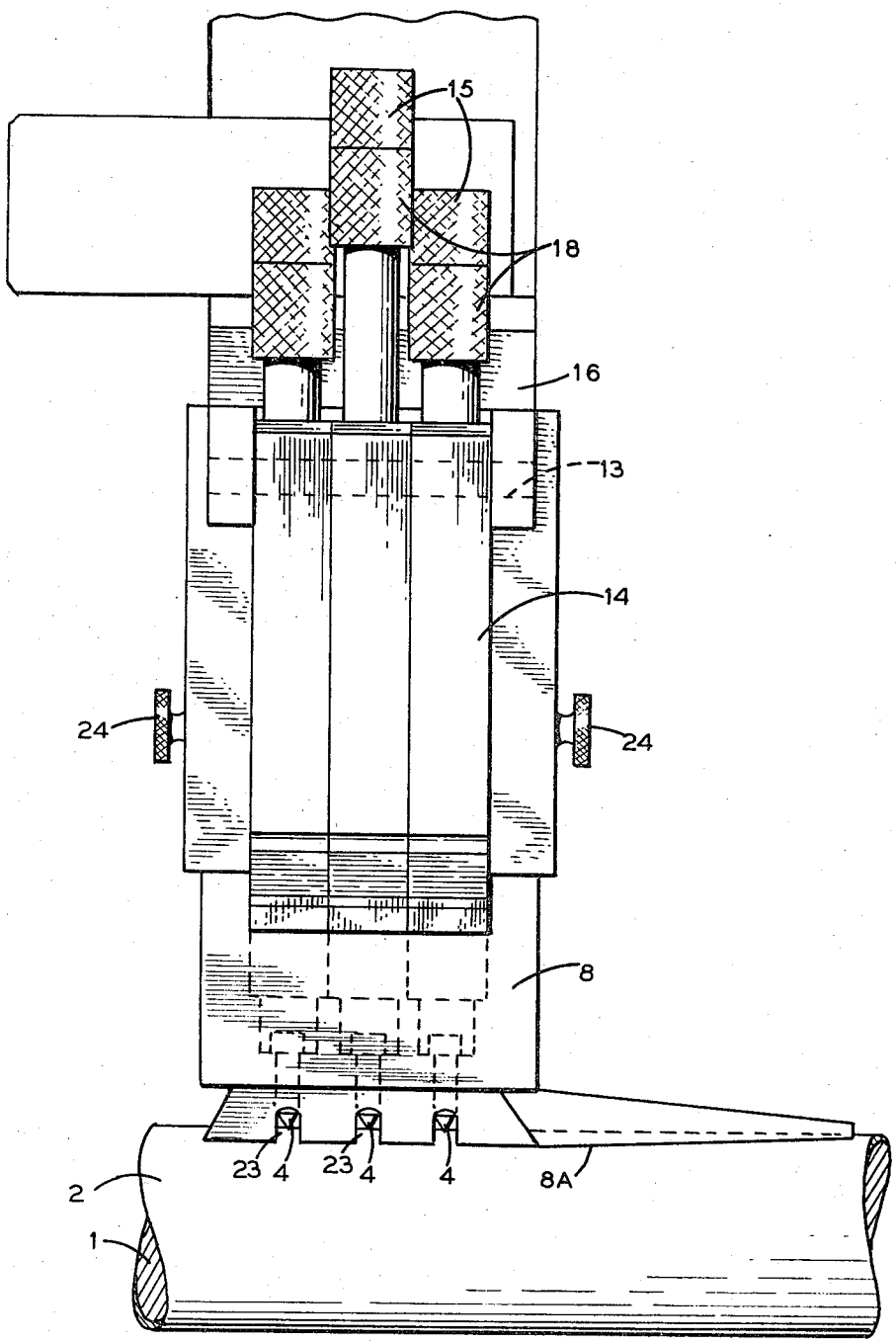
FIG. 2 is a side elevational view thereof.

As shown in FIGS. 1 and 2, 3 designates a multiarc welding apparatus embodying the invention. The same is shown in a typical application thereof, for forming a welded longitudinal seam in a thin metal sheathing 2 enclosing a multiconductor communication cable 1. Apparatus 3 is in a fixed position, with cable 1 and its sheathing 2 moving past such position at a relatively high speed.

As shown, apparatus 3 includes three welding electrodes 4 arranged in a line for location in the direction of the cable 1 as it moves to have its sheathing 2 seamed. The electrodes 4 are respectively mounted in separate holders 5 which include electrode gripping means 6 at the lower ends thereof, which is associated clamping means 7.

Hood means, generally indicated at 8 is arranged to enclose the lower ends of electrodes 4 and is mounted on holder 5 by way of gasket means 9. Inert protective gas such as argon or the like, is admitted to the interior of hood means 8, by way of an inlet 10. A coolant passage 10A on hood means 8, supplied by way of inlet 10B, may be used when suitable to particular welding conditions.

The clamping means 7 is formed of brass or the like is provided with lateral connections 11, 12 for supplying coolant to the electrodes, as an inlet and outlet for the coolant. The coolant connection 12 serves as a lead for the high frequency current used at the initiation of the welding operation to automatically ignite the electric arc between electrodes 4 and sheath 2. Thereafter the usual current supply for the electrodes is fed to connection 12.

For vertical and horizontal adjustment of the individual electrodes 4, each holder 5 is mounted in a rocking member 14 movable about a pivot 13. The movement of member 14 is adjusted by way of a vertical screw 15 threaded in a member 16 and bearing on an offset portion 14A of member 14. The action of screw 15 is opposed by spring means 17 alined with said screw 15 and positioned on support means 17A. Thus, the electrodes 4 may be individually and separately moved from side to side to selected positions thereof.

Screw means 18 vertically mounted on member 14 and in engagement with holder 5 via spindle means 19 provides for vertical adjustment of each of electrodes 4. Turning screw means 18 in either direction provides for guided movement of member 5 through slot 5A and flange 5B received in said slot.

Further, means is provided for common vertical and horizontal displacement of electrodes 4 as a single group. To this end, member 16 and member 14 are mounted on adapter 20 with a screw 21 for moving the entire assembly in vertical directions. Also, the assembly of electrodes 4 may be tilted transversely of the welded seam by means of a common pivot 22.

In addition to providing a fine adjustment of the position of electrodes 4, the tilting of the assembly about pivot allows for convenient cleaning or replacement of the individual electrodes 4.

The protective hood 8 is provided with ports 23 along the sides thereof to provide for visual inspection and supervision of the welding operation. The hood 8 may be retained in place by suitable means, such as screws 24 in engagement with members 14.

It will be apparent from a consideration of FIG. 2, that the lower edges 8A of hood means 8 conform and contact opposing surface portions of sheathing 2 providing the work piece, and the protective gas is applied transversely of the electrodes 4.

It is understood that spacer members may be disposed between holders 5 to adjust the spacing between adjacent electrodes 4, as desired. Also, holders 5 are formed from suitable refractory ceramic material having a high heat conductivity.

As various changes might be made in the herein disclosed embodiment of the invention without departing from the spirit thereof, it is understood that all matter herein shown or described shall be deemed illustrative and not by way of limitation except as set forth in the appended claims.

We claim:

1. Apparatus for welding adjacent edges of a metal sheet workpiece in motion, said apparatus comprising a plurality of welding electrodes in spaced line arrangement, holder means for each electrode, means for moving each holder means vertically toward and away from said workpiece, and pivot means rotatable about a horizontal axis for independently swinging each holder in a wide arc to provide substantially horizontal movement thereof whereby to selectively position the electrode thereof relative to the other electrodes and the edges of said workpiece; means for simultaneously moving all of said holder means as a unit in vertical directions and pivot means for swinging all of said holder means as a unit in a wide arc to provide substantially horizontal movement thereof to selectively position all of the electrodes thereof relative to the edges of said workpiece, and separate power input means for each electrode holder.

2. Apparatus as in claim 1 and further including hood means for enclosing the lower ends of said electrodes and extending to opposed surface portions of the workpiece, and inlet means on said hood means for supplying inert protective gas thereto.

3. Apparatus as in claim 1 wherein said electrode holder means are formed of ceramic having a high thermal conductivity.

4. Apparatus as in claim 1 wherein each electrode holder includes means for passing a fluid coolant therethrough.

5. Apparatus as in claim 2 wherein said hood means includes viewing ports for visually checking the welding operation.